(12) United States Patent
Saito

(10) Patent No.: US 11,467,787 B2
(45) Date of Patent: Oct. 11, 2022

(54) COMMUNICATION SYSTEM, FIRST SERVER, SECOND SERVER, NON-TRANSITORY COMPUTER-READABLE RECORDING MEDIUM STORING COMPUTER-READABLE INSTRUCTIONS FOR FIRST SERVER AND NON-TRANSITORY COMPUTER-READABLE RECORDING MEDIUM STORING COMPUTER-READABLE INSTRUCTIONS FOR SECOND SERVER

(71) Applicant: BROTHER KOGYO KABUSHIKI KAISHA, Nagoya (JP)

(72) Inventor: Ken Saito, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/337,700

(22) Filed: Jun. 3, 2021

(65) Prior Publication Data

US 2021/0382664 A1 Dec. 9, 2021

(30) Foreign Application Priority Data

Jun. 5, 2020 (JP) .............................. JP2020-098851

(51) Int. Cl.
*G06F 3/12* (2006.01)

(52) U.S. Cl.
CPC ............ *G06F 3/121* (2013.01); *G06F 3/1234* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 9,386,170 B2 * | 7/2016 | Nagasaki | G06F 3/1259 |
| 10,397,439 B2 * | 8/2019 | Maeda | H04N 1/00344 |
| 2018/0267755 A1 * | 9/2018 | Okazawa | G06F 3/121 |

FOREIGN PATENT DOCUMENTS

| | | |
|---|---|---|
| JP | 2013-061836 A | 4/2013 |
| JP | 2015-022682 A | 2/2015 |

OTHER PUBLICATIONS

Machine translation of Japanese Application No. 2013-061836 to Oshima et al. published on Apr. 2013.*

\* cited by examiner

*Primary Examiner* — Paul F Payer
(74) *Attorney, Agent, or Firm* — Scully, Scott, Murphy & Presser, PC

(57) ABSTRACT

A first server may receive error information from a communication device at a predetermined timing, send error receipt information to a second server. The second server may send destination information to the first server, the destination information indicating a destination in the second server to which the first server is to send a changing signal in response to the state of the communication device being changed from the error state to a non-error state. The first server may send the changing signal to the second server by using the destination information. The second server may identify from a memory first data to be sent to the communication device, send first relation information related to the identified first data to the first server. The first server may send to the communication device first instruction information corresponding to the first relation information.

17 Claims, 8 Drawing Sheets

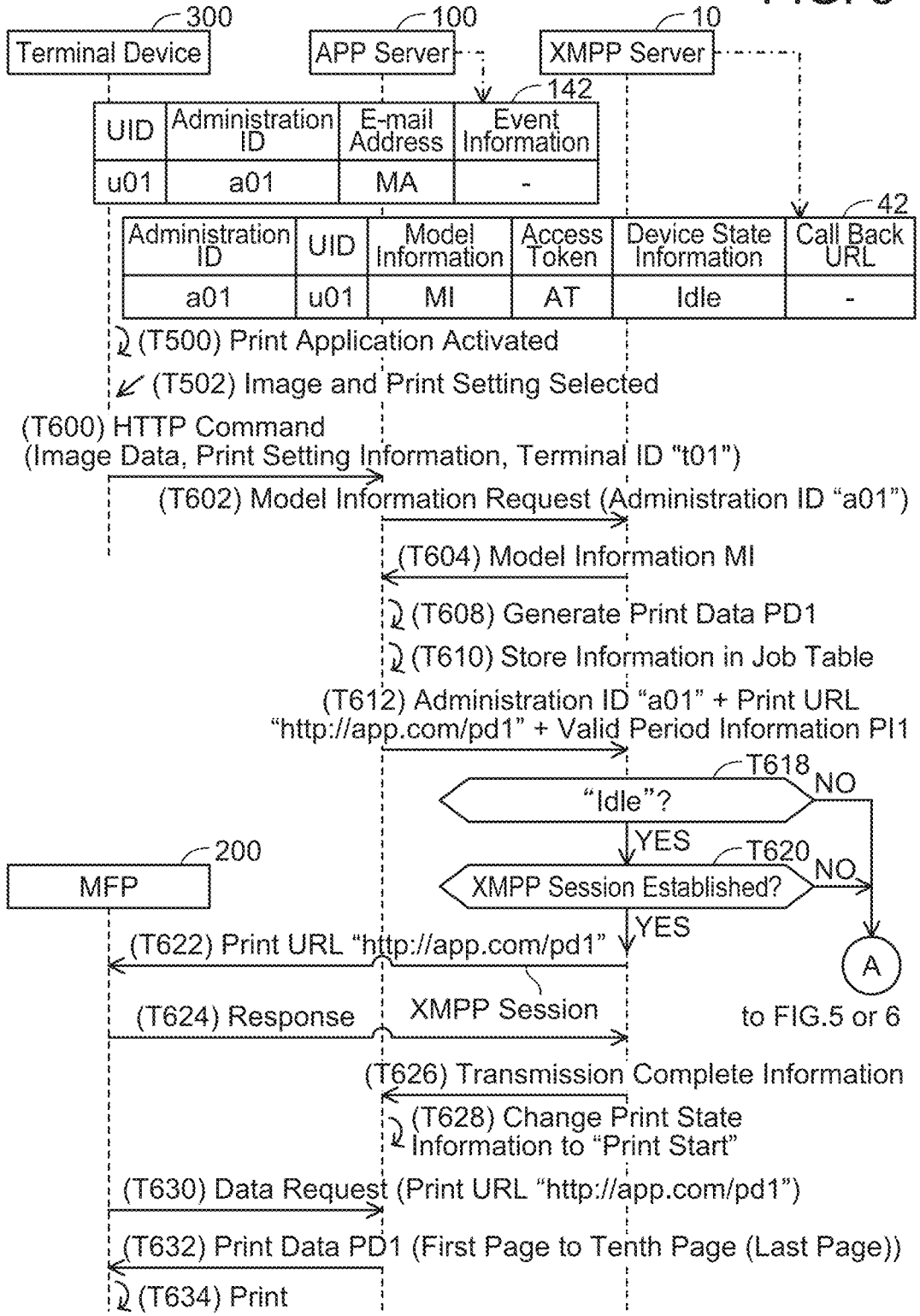

COMMUNICATION SYSTEM, FIRST SERVER, SECOND SERVER, NON-TRANSITORY COMPUTER-READABLE RECORDING MEDIUM STORING COMPUTER-READABLE INSTRUCTIONS FOR FIRST SERVER AND NON-TRANSITORY COMPUTER-READABLE RECORDING MEDIUM STORING COMPUTER-READABLE INSTRUCTIONS FOR SECOND SERVER

CROSS-REFERENCE TO RELATED APPLICATION

This application claims priority to Japanese Patent Application No. 2020-098851 filed on Jun. 5, 2020, the contents of which are hereby incorporated by reference into the present application.

TECHNICAL FIELD

The disclosure herein discloses art related to a server configured to receive data from a terminal device and sends the data to a communication device.

DESCRIPTION OF RELATED ART

A server that receives an e-mail from a communication terminal is known. The server generates print data from a file attached to the e-mail, and sends a print job-pending notification to a printer by using an Extensible Messaging and Presence Protocol (XMPP) connection. When receiving the print job-pending notification, the printer establishes a Hypertext Transfer Protocol (HTTP) connection with the server and sends a print data transmission request to the server, and receives the print data from the server. Here, an error may occur in the printer while the printer is receiving the print data. In such a case, the printer re-establishes the HTTP connection with the server when the error is resolved, re-sends the print data transmission request to the server, and receives the print data from the server.

SUMMARY

In the technique as above, the printer attempts to re-establish the HTTP connection regardless of a state of the server. Due to this, re-establishment of the HTTP connection could fail depending on the status of the server. If the re-establishment of the HTTP connection fails, the printer cannot receive the print data from the server.

The disclosure herein provides art that enables a server to suitably send data to a communication device when an error in the communication device is resolved.

A communication system disclosed herein may comprise: a first server; and a second server, wherein the second server comprises: a second processor; and a second storage storing second computer-readable instructions therein, wherein the second computer-readable instructions, when executed by the second processor, cause the second server to: in a case where data is received from a terminal device, store the data in a memory, the first server comprises: a first processor; and a first storage storing first computer-readable instructions therein, wherein the first computer-readable instructions, when executed by the first processor, cause the first server to: receive error information from a communication device that is different from the terminal device at a predetermined timing, the error information indicating that a state of the communication device is an error state in which the communication device is not capable of processing data; and in a case where the error information is received from the communication device, send error receipt information to the second server, the error receipt information indicating that the error information has been received from the communication device, wherein the second computer-readable instructions, when executed by the second processor, further cause the second server to: in a case where the error receipt information is received from the first server, send destination information to the first server, the destination information indicating a destination in the second server to which the first server is to send a changing signal in response to the state of the communication device being changed from the error state to a non-error state in which the communication device is capable of processing data, wherein the first computer-readable instructions, when executed by the first processor, further cause the first server to: in a case where a state change information is received from the communication device after the destination information has been received from the second server, send the changing signal to the second server by using the destination information, the state change information indicating that the state of the communication device has been changed from the error state to the non-error state, wherein the second computer-readable instructions, when executed by the second processor, further cause the second server to: in a case where the changing signal is received from the first server, identify from the memory first data to be sent to the communication device; and send first relation information related to the identified first data to the first server, wherein the first computer-readable instructions, when executed by the first processor, further cause the first server to: in a case where the first relation information is received from the second server, send to the communication device first instruction information corresponding to the first relation information by using a session for executing server-push communication, the first instruction information being for instructing the communication device to send the first relation information corresponding to the first instruction information to the second server, and wherein the second computer-readable instructions, when executed by the second processor, further cause the second server to: in a case where the first relation information is received from the communication device, send to the communication device second data obtained by using the first data related to the first relation information.

A first server disclosed herein may comprise: a first processor; and a first storage storing first computer-readable instructions therein, wherein the first computer-readable instructions, when executed by the first processor, cause the first server to: receive error information from a communication device at a predetermined timing, the error information indicating that a state of the communication device is an error state in which the communication device is not capable of processing data; in a case where the error information is received from the communication device, send error receipt information to a second server, wherein the error receipt information indicates that the error information has been received from the communication device, and the second server sends destination information to the first server, the destination information indicating a destination in the second server to which the first server is to send a changing signal in response to the state of the communication device being changed from the error state to a non-error state in which the communication device is capable of processing data; in a case where a state change information is received from the communication device after the destination information has been received from the second server, send the changing signal to the second server by using the destination information, wherein the state change information indicates that the state of the communication device has been changed from the error state to the non-error state, the second server identifies from a memory first data to be sent to the communication device in a case where the changing signal is received from the first server, and the second server sends first relation information related to the identified first data to the first server; and in a case where the first relation information is received from the second server, send to the communication device first instruction information corresponding to the first relation information by using a session for executing server-push communication, wherein the first instruction information is information for instructing the communication device to send the first relation information corresponding to the first instruction information to the second server, and the second server sends to the communication device second data obtained by using the first data related to the first relation information in a case where the first relation information is received from the communication device.

A second server disclosed herein may comprise: a second processor; and a second storage storing second computer-readable instructions therein, wherein the second computer-readable instructions, when executed by the second processor, cause the second server to: in a case where data is received from a terminal device, store the data in a memory; in a case where error receipt information is received from a first server, send destination information to the first server, wherein the destination information indicates a destination in the second server to which the first server is to send a changing signal in response to a state of a communication device that is different from the terminal device being changed from an error state to a non-error state, the first server receives error information from the communication device at a predetermined timing, the error information indicating that a state of the communication device is the error state, the first server sends the error receipt information to the second server, the error receipt information indicating that the error information has been received from the communication device in a case where the error information is received from the communication device, the error state is a state in which the communication device is not capable of processing data, and the non-error state is a state in which the communication device is capable of processing data; in a case where the first server receives a state change information from the communication device after the destination information has been sent to the first server, receive the changing signal from the first server, the state change information indicating that a state of the communication device has been changed from the error state to the non-error state; in a case where the changing signal is received from the first server, identify from the memory first data to be sent to the communication device; send first relation information related to the identified first data to the first server, wherein the first server sends first instruction information corresponding to the first relation information by using a session for executing server-push communication to the communication device in a case where the first relation information is received from the second server, and the first instruction information is information for instructing the communication device to send the first relation information corresponding to the first instruction information to the second server; and in a case where the first relation information is received from the communication device, send to the communication device second data obtained by using the first data related to the first relation information.

A control method implemented by any one of the first server and the second server, a computer program for any one of the first server and the second server and a non-transitory computer-readable recording medium storing computer-readable instructions for any one of the first server and the second server are also novel and useful.

BRIEF DESCRIPTION OF DRAWINGS

FIG. 8 shows a sequence diagram of a process for executing application printing according to a second embodiment.

EMBODIMENTS

Figure 1:
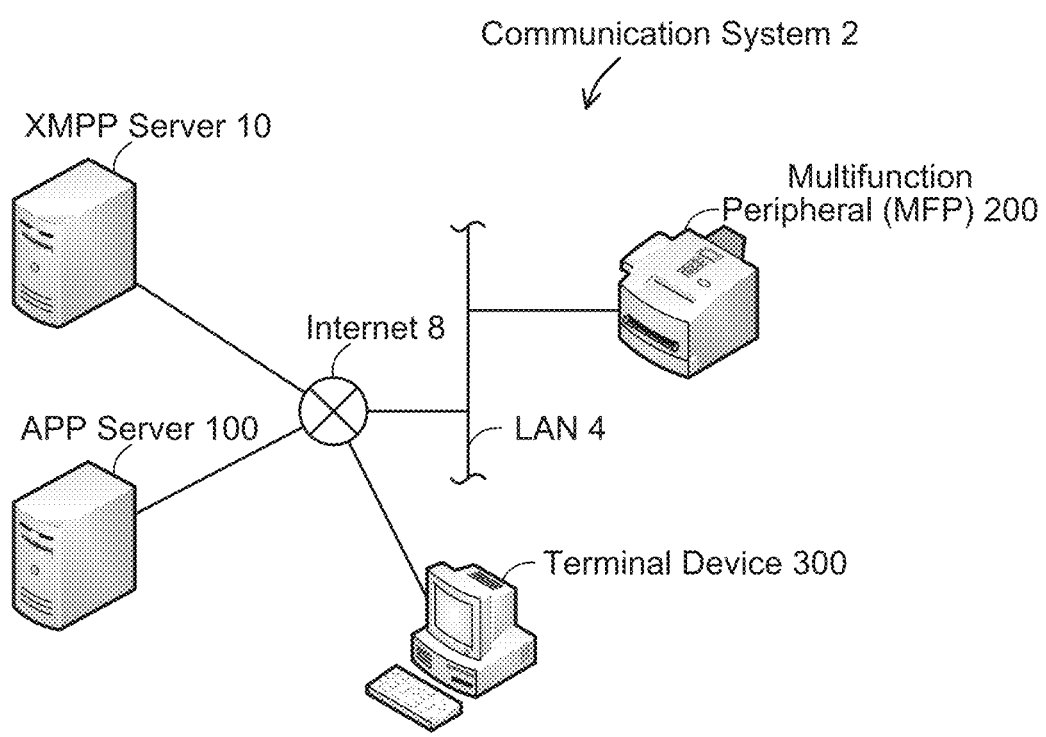
FIG. 1 shows a configuration of a communication system.

First Embodiment (Configuration of Communication System 2: FIG. 1)

As shown in FIG. 1, a communication system 2 includes an Extensible Messaging and Presence Protocol (XMPP) server 10, an APP server 100, a multifunction device 200, and a terminal device 300. Hereinbelow, a multifunction device is termed "Multifunction Peripheral (MFP)".

The XMPP server 10, the APP server 100, and the terminal device 300 are connected to the Internet 8. The XMPP server 10 is configured to communicate with each of the devices 100, 300 via the Internet 8. The MFP 200 is connected to a Local Area Network (LAN) 4. The LAN 4 is connected to the Internet 8. The MFP 200 is configured to communicate with each of the devices 10, 100, 300 via the LAN 4 and the Internet 8. The LAN 4 may be a wired LAN or a wireless LAN.

Figure 2:
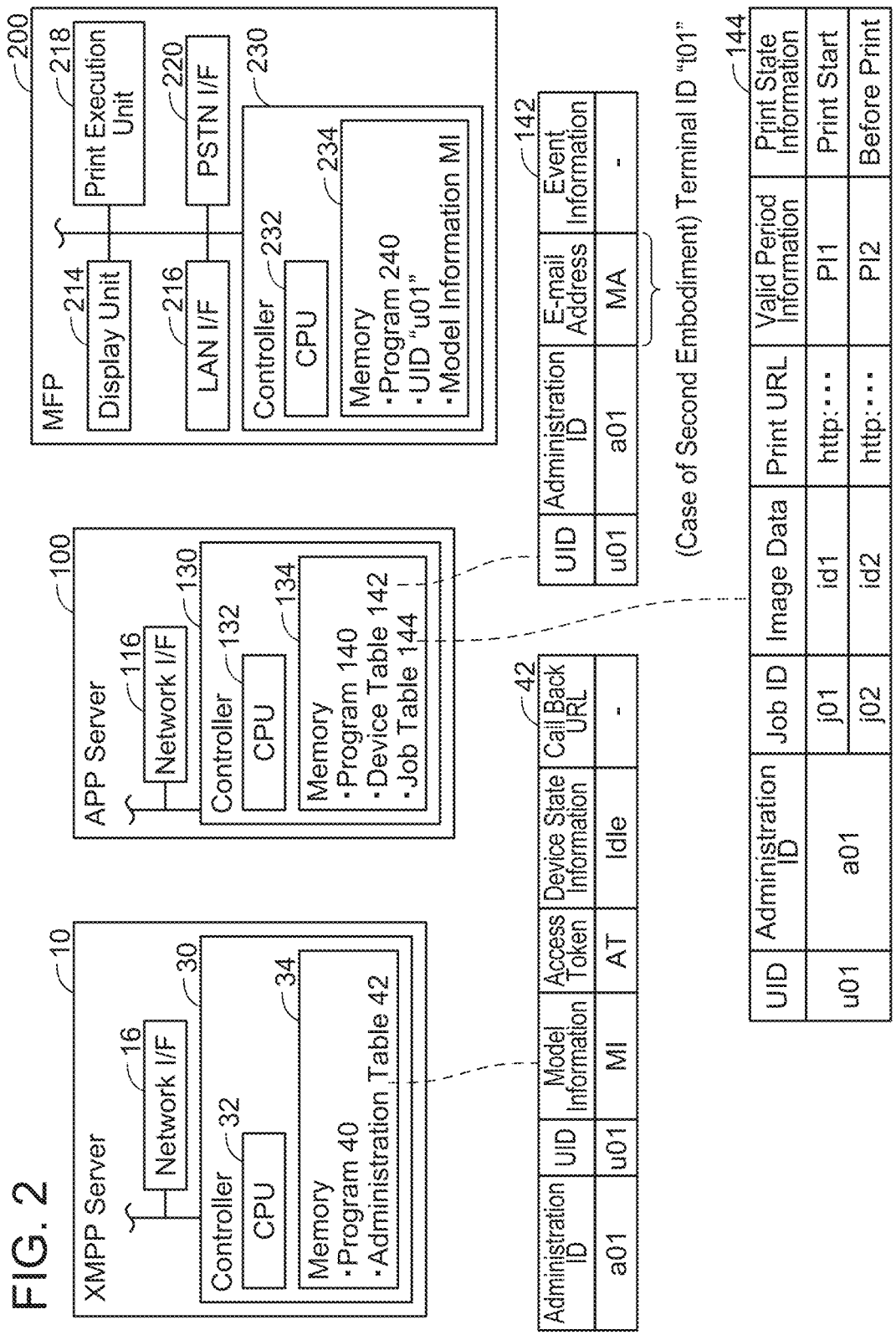
FIG. 2 shows a block diagram of respective configurations of devices in the communication system.

(Configuration of XMPP Server 10: FIG. 2)

The XMPP server 10 is a server for establishing an XMPP session with an MFP (e.g., MFP 200). The XMPP server 10 is installed on the Internet 8 by a vendor of the MFP 200.

The XMPP session is a session according to XMPP. By using the XMPP session, the XMPP server 10 is capable of sending requests to an MFP beyond a firewall of a LAN to which the MFP belongs (e.g., a firewall formed by a router) without having have to receive requests from the MFP. That is, the XMPP session is a session configured to execute server-push communication. The XMPP session is kept established until power of the MFP is turned OFF. A scheme for sending a request from the XMPP server 10 to the MFP (i.e., scheme for executing the server-push communication) may not be the XMPP session but another method. For example, a session according to Hypertext Transfer Protocol Secure (HTTPS) may be established between the MFP and the XMPP server 10.

The XMPP server 10 includes a network interface 16 and a controller 30. Each of the units 16, 30 is connected to a bus line (reference sign omitted). Hereinbelow, an interface will be termed "I/F". The network I/F 16 is an I/F for executing communication via the Internet 8, and is connected to the Internet 8 (see FIG. 1). The controller 30 incudes a CPU 32 and a memory 34. The CPU 32 is configured to execute various processes according to a program 40 stored in the memory 34. The memory 34 is configured of a volatile memory, a nonvolatile memory, and the like. The memory 34 further stores, in addition to the program 40, an administration table 42.

The administration table 42 is a table for managing information related to MFPs. The administration table 42 stores, for each of a plurality of MFPs, an administration Identifier (ID) for managing the MFP, a UID being identification information obtained from the MFP, model information of the MFP, an access token of the MFP, and device state information in association with each other. The model information indicates information related to a model of the corresponding MFP (e.g., model name, spec). The access token is authentication information for establishing an XMPP session with the corresponding MFP. The device state information indicates a state of the corresponding MFP. The device state information indicates one of a plurality of states including "busy", being a state in which the MFP is incapable of processing data, and "idle", being a state in which the MFP can process data. Here, "busy" may for example indicate paper jam or out-of-ink.

Further, when a Callback Uniform Resource Locator (URL) to be described later is received from the APP server 100, the XMPP server 10 stores this received Callback URL in the administration table 42 in association with a corresponding administration ID.

(Configuration of APP Server 100)

The APP server 100 is a server for executing communication for e-mail printing with MFPs (e.g., MFP 200). The e-mail printing is a function of causing an MFP to execute printing of an image corresponding to image data included in an e-mail. The APP server 100 is installed on the Internet 8 by the vendor of the MFP 200.

The APP server 100 includes a network I/F 116 and a controller 130. Each of the units 116, 130 is connected to a bus line (reference sign omitted). The network I/F 116 is connected to the Internet 8 (see FIG. 1). The controller 130 incudes a CPU 132 and a memory 134. The CPU 132 is configured to execute various processes according to a program 140 stored in the memory 134. The memory 134 further stores, in addition to the program 140, a device table 142 and a job table 144.

The device table 142 is a table for registering information related to MFPs. The device table 142 stores, for each of a plurality of MFPs, a UID obtained from the MFP, an administration ID stored in association with the UID in the XMPP server 10, an e-mail address that is to be used in the e-mail printing, and event information in association with each other. The event information is information related to an event that occurred in the APP server 100. Information related to various events may be described in the event information. For example, when an event in which the APP server 100 sends the Callback URL to be described later to the XMPP server 10 occurs, this Callback URL is described in the event information.

The job table 144 is a table for managing a plurality of print jobs. The job table 144 stores, for each of the plurality of print jobs, a UID, an administration ID, a job ID identifying the print job, a file name of image data corresponding to a print target of the print job, a print URL corresponding to the print job, valid period information indicating a valid period of the print job, and print state information corresponding to the print job in association with each other. The print URL will be described later. The print state information indicates a state of the corresponding print job. The print state information indicates one of a plurality of states including "print start", "before print", "print completed", and "interrupted". "Print start" indicates a state in which the print URL of the corresponding print job has been sent to the MFP. "Before print" indicates a state in which the print URL of the corresponding print job has not been sent to the MFP. "Print completed" indicates a state in which, after the print URL of the corresponding print job was sent to the MFP, a notification indicating that printing has been completed has been received from the MFP. "Interrupted" indicates a state in which, after the print URL of the corresponding print job was sent to the MFP, printing in the MFP has been interrupted.

In the e-mail printing, the APP server 100 and the XMPP server 10 cooperate. Although details will be described later, by using the XMPP session, the MFP can be caused to execute printing of an image corresponding to image data included in an e-mail without receiving a request from the MFP. Further, the vendor installs another APP server different from the APP server 100 on the Internet 8. This other APP server is a server for executing communication for another function using the Internet 8 different from the e-mail printing (e.g., function of sending a setting value to a MFP via the Internet 8) with MFPs. The other APP server and the XMPP server 10 cooperate in this other function. That is, one XMPP server 10 and a plurality of APP servers cooperate. By having the XMPP established between the one XMPP server 10 and a MFP, the MFP can be caused to execute a plurality of functions using the Internet 8.

(Configuration of MFP 200)

The MFP 200 is a peripheral device configured to execute multiple functions including a print function, a scan function, and a facsimile function (i.e., a peripheral device of a terminal device connected to the LAN 4). The MFP 200 includes a display unit 214, a LAN I/F 216, a print executing unit 218, a Public Switched Telephone Network (PSTN) I/F 220, and a controller 230. Each of the units 214 to 230 is connected to a bus line (reference sign omitted). The display unit 214 is a display for displaying various types of information. The display unit 214 is a so-called touch screen, and functions also as an operation unit. The LAN I/F 216 is connected to the LAN 4 (see FIG. 1). The print executing unit 218 includes a print mechanism of an inkjet scheme, a laser scheme, or the like. The PSTN I/F 220 is an I/F for executing facsimile communication.

The controller 230 incudes a CPU 232 and a memory 234. The CPU 232 is configured to execute various processes according to a program 240 stored in the memory 234. The memory 234 further stores a UID "u01" of the MFP 200 and model information MI of the MFP 200. The UID is information identifying a user who uses the MFP 200 (e.g., account name). In a variant, the UID may be information identifying the MFP 200 (e.g., serial number).

Figure 3:
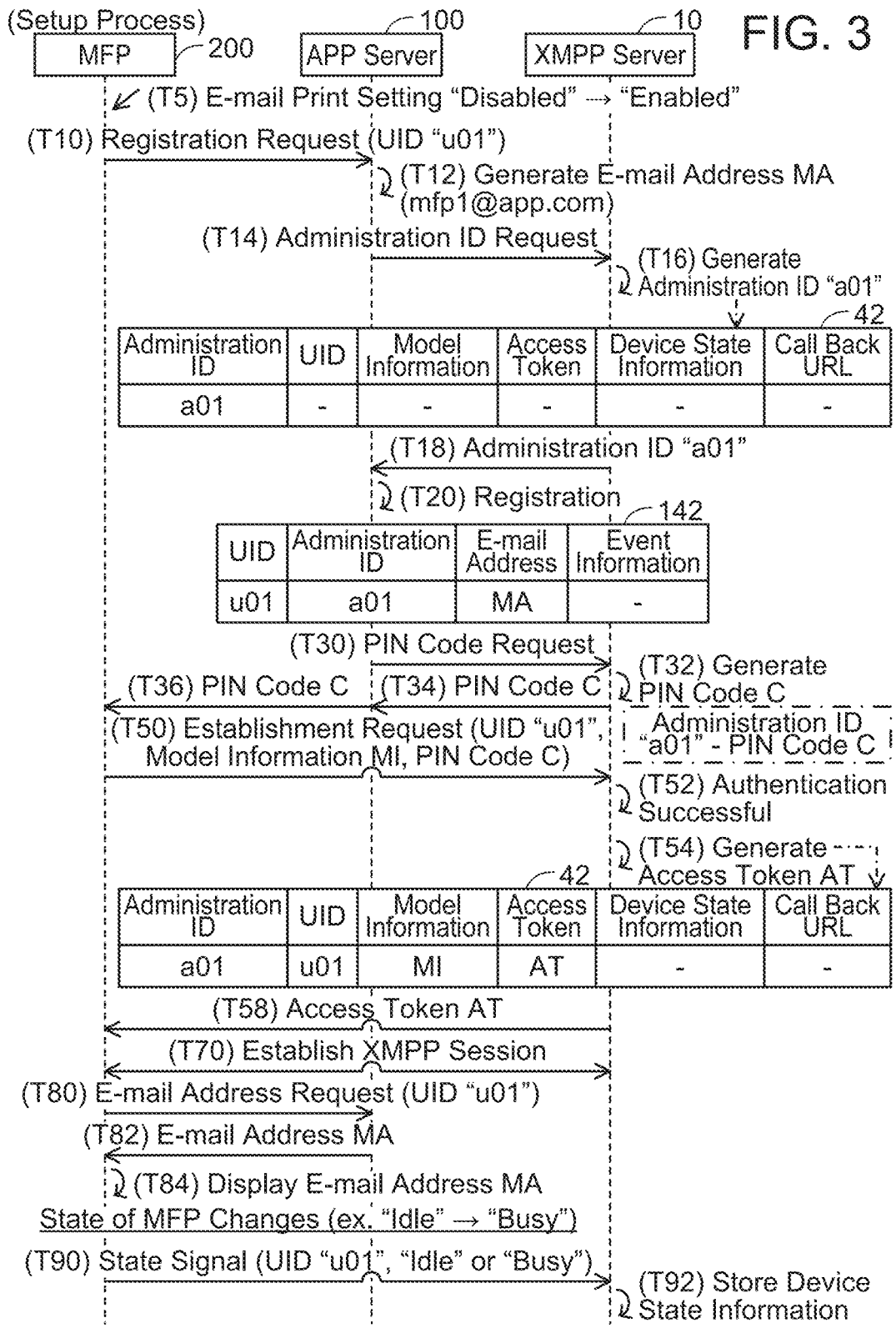
FIG. 3 shows a sequence diagram of a setup process.

(Setup Process: FIG. 3)

A setup process of registering information used in the communication for the e-mail printing in the APP server 100 and establishing an XMPP session will be described with reference to FIG. 3. Hereinbelow, for easier understanding, processes executed by the respective CPUs of the devices (e.g., the CPU 32 of the XMPP server 10) will be described with the devices (e.g., the XMPP server 10) as a subject of an action instead of the CPUs as the subject of the action. Further, hereinbelow, communication is executed between the MFP 200 and each of the servers 10, 100 via the LAN 4 and the Internet 8. Further, communication is executed between the XMPP server 10 and the APP server 100 via the Internet 8. Hereinbelow, unless otherwise described the explanations "via the LAN 4" and "via the Internet 8" will be omitted.

In T5, the MFP 200 accepts an operation by the user for changing an e-mail printing setting from "disabled" to "enabled". The e-mail printing setting indicates a setting regarding whether to permit execution of the e-mail printing. "Disabled" indicates that the execution of the e-mail printing is prohibited, and "enabled" indicates that the execution of the e-mail printing is permitted. By default, the e-mail printing setting indicates "disabled".

When the e-mail printing setting is changed from "disabled" to "enabled" in T5, the MFP 200 sends a registration request requesting registration of the information used in the communication for the e-mail printing to the APP server 100 in T10. The registration request includes the UID "u01".

When receiving the registration request from the MFP 200 in T10, the APP server 100 generates an e-mail address MA in T12. The e-mail address MA includes a local part "mfp1" and a domain name "app.com" of the APP server 100.

In T14, the APP server 100 sends to the XMPP server 10 an administration ID request requesting the XMPP server 10 to send an administration ID.

When receiving the administration ID request from the APP server 100 in T14, the XMPP server 10 generates an administration ID "a01" and stores the administration ID "a01" in the administration table 42 in T16.

In T18, the XMPP server 10 sends the administration ID "a01" to the APP server 100.

When receiving the administration ID "a01" from the XMPP server 10 in T18, the APP server 100 stores in the device table 142 the UID "u01" in the registration request of T10, the administration ID "a01" received in T18, and the e-mail address MA generated in T12 in association with each other in T20. Due to this, the information used in the communication for the e-mail printing is registered in the APP server 100. At this time point, no event information is stored in association with the UID "u01" in the device table 142.

Next in T30, the APP server 100 sends a PIN code request requesting a Personal Identification Number (PIN) code to the XMPP server 10.

When receiving the PIN code request from the APP server 100 in T30, the XMPP server 10 generates a PIN code C in T32. The XMPP server 10 stores the administration ID "a01" and the PIN code C in association with each other in the memory 34.

In T34, the XMPP server 10 sends the PIN code C to the APP server 100. Due to this, the APP server 100 sends the PIN code C received from the XMPP server 10 to the MFP 200 in T36.

When receiving the PIN code C from the APP server 100 in T36, the MFP 200 sends to the XMPP server 10 an establishment request requesting establishment of an XMPP session to be established in T50. The establishment request includes the UID "u01", the model information MI, and the PIN code C.

When receiving the establishment request from the MFP 200 in T50, the XMPP server 10 executes authentication of the PIN code C in the establishment request in T52. In the present case, the authentication of the PIN code C is successful since the PIN code C in the establishment request matches the PIN code C in the memory 34 of the XMPP server 10. Then, the XMPP server 10 executes processes from T54. If the authentication of the PIN code in the establish request fails, the XMPP server 10 does not execute the processes from T54.

In T54, the XMPP server 10 generates an access token AT. The XMPP server 10 identifies the administration ID "a01" stored in association with the PIN code C from the memory 34. Then, the XMPP server 10 stores the identified administration ID "a01", the UID "u01" in the establish request, the model information MI in the establish request, and the generated access token AT in association with each other in the administration table 42. At this time point, neither device state information nor Callback URL is stored in association with the administration ID "a01" in the administration table 42.

In T58, the XMPP server 10 sends the access token AT to the MFP 200. As a result of this, the MFP 200 establishes the XMPP session with the XMPP server 10 using the access token AT in T70.

Further, when establishment of the XMPP session is completed, the MFP 200 sends to the APP server 100 an e-mail address request requesting an e-mail address in T80. The e-mail address request includes the UID "u01".

When receiving the e-mail address request from the MFP 200 in T80, the APP server 100 sends to the MFP 200 the e-mail address MA stored in association with the UID "u01" in the e-mail address request in T82.

When receiving the e-mail address MA from the APP server 100 in T82, the MFP 200 causes the display unit 214 to display the e-mail address MA in T84. Due to this, the user can acknowledge the e-mail address MA.

The MFP 200 sends a state signal indicating a state of the MFP 200 to the XMPP server 10 at a predetermined timing after the XMPP session with the XMPP server 10 has been established (T90). The predetermined timing may for example be a timing when the state of the MFP 200 changed (e.g., changed from "idle" to "busy"). The state signal includes the UID "u01" of the MFP 200 and information indicating the current state of the MFP 200 (e.g., "busy").

When receiving the state signal from the MFP 200 in T90, the XMPP server 10 stores in the administration table 42 the information in the state signal (e.g., "busy") as device state information in association with the UID "u01" in the state signal in T92.

Figure 4:
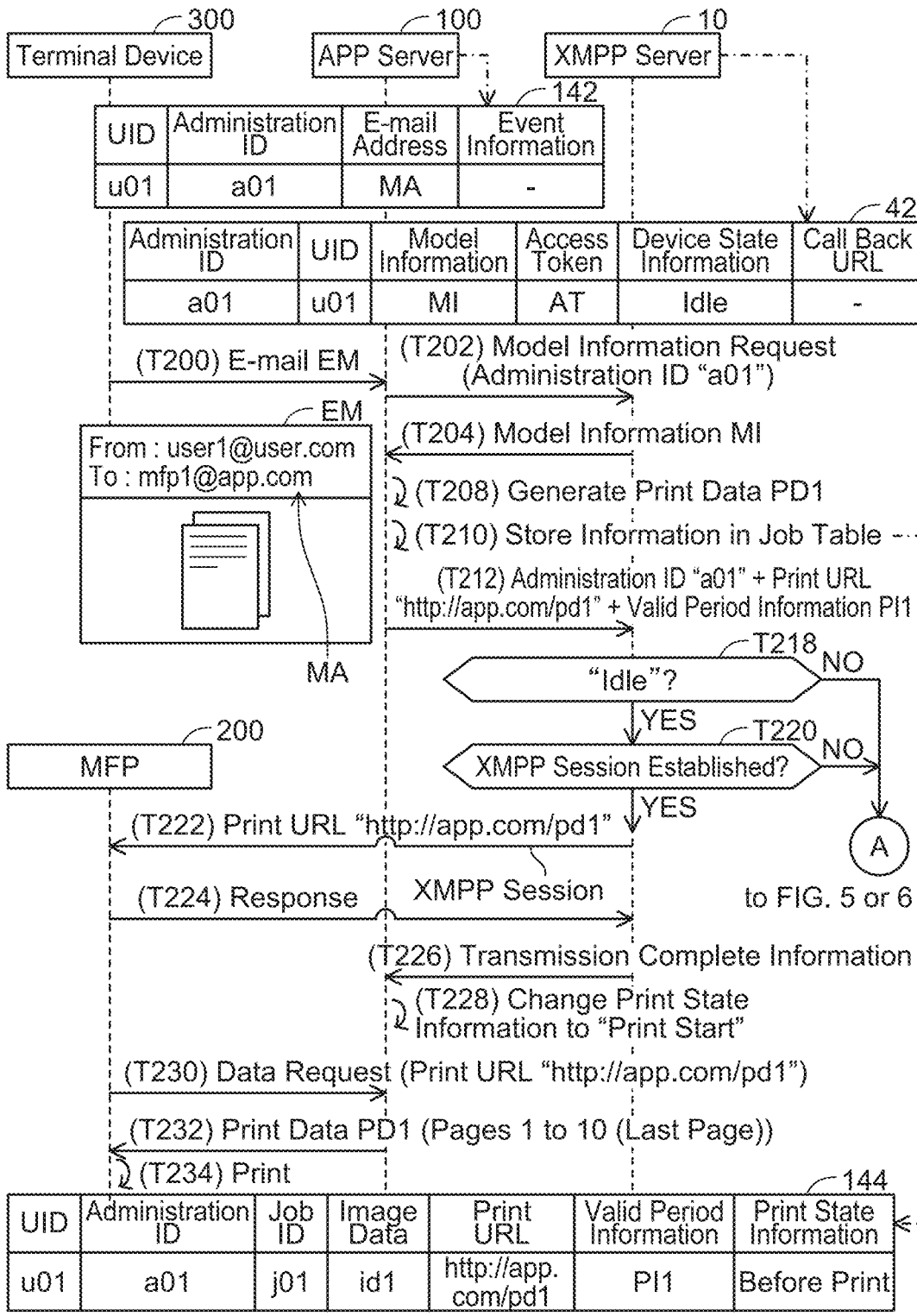
FIG. 4 shows a sequence diagram of a process for executing e-mail printing.

(Process for Executing E-mail printing: FIG. 4)

A process for executing the e-mail printing will be described with reference to FIG. 4. In T200, the terminal device 300 sends an e-mail EM including the e-mail address MA as a recipient address to the APP server 100. The e-mail EM includes image data corresponding to an image to be printed. This image data may for example be data corresponding to a document containing images corresponding to a plurality of pages.

When receiving the e-mail EM from the terminal device 300 in T200, the APP server 100 identifies the administration ID "a01" stored in association with the e-mail address MA included in the e-mail EM from the device table 142. Then in T202, the APP server 100 sends a model information request requesting model information to the XMPP server 10. The model information request includes the identified administration ID "a01". Further, the APP server 100 stores a sender address included in the e-mail EM received in T200 in association with the administration ID "a01" in the memory 134.

When receiving the model information request from the APP server 100 in T202, the XMPP server 10 sends the model information MI stored in association with the administration ID "a01" included in the model information request to the APP server 100 in T204.

In T208, the APP server 100 uses the model information MI to convert the image data included in the e-mail EM and generates print data PD1 having a data format which the MFP 200 is capable of interpreting. Here, the APP server 100 generate the print data PD1 according to a print setting (e.g., paper size) inputted to the APP server 100 by the user. In a variant, the APP server 100 may generate the print data PD1 according to a print setting described in a main text of the e-mail EM.

In T210, the APP server 100 stores, in the job table 144, information related to a print job to be executed according to the print data PD1. Specifically, the APP server 100 stores the administration ID "a01", a new job ID "j01", a file name "id1" of the image data included in the e-mail EM, a print URL "http://app.com/pd1", valid period information PH, and the print state information "before print" in association with the UID "u01" in the job table 144. Here, the print URL "http://app.com/pd1" indicates a location within the APP server 100 where the print data PD1 is stored, and a character string "pdl" is the file name of the print data PD1.

In T212, the APP server 100 sends the administration ID "a01", the print URL "http://app.com/pd1", and the valid period information PH to the XMPP server 10. Due to this, the XMPP server 10 stores the administration ID "a01", the print URL "http://app.com/pd1", and the valid period information PH in association with each other in the memory 34.

When receiving the above information including the print URL "http://app.com/pd1" from the APP server 100 in T212, the XMPP server 10 determines in T218 whether the device state information stored in association with the administration ID "a01" in the administration table 42 indicates "idle". The XMPP server 10 proceeds to T220 in a case of determining that the device state information indicates "idle" (YES in T218). On the other hand, the XMPP server 10 proceeds to a process of FIG. 6 to be described later in a case of determining that the device state information indicates "busy" (NO in T218).

In T220, the XMPP server 10 determines whether an XMPP session with the MFP 200 is currently established. For example, in the case where the XMPP session with the MFP 200 is currently established, the XMPP server 10 stores in the memory 34 establishment information, which indicates that the XMPP session is currently established, in association with the administration ID "a01" identifying the MFP 200. The XMPP server 10 determines that the XMPP session with the MFP 200 is currently established (YES in T220) in the case where the establishment information is stored in association with the administration ID "a01" received in T212. In this case, the XMPP server 10 proceeds to T222 described later. On the other hand, in the case where the establishment information is not stored in association with the administration ID "a01" received in T212, the XMPP server 10 determines that the XMPP session with the MFP 200 is currently not established (NO in T220). In this case, the XMPP server 10 proceeds to a process of FIG. 5 to be described later.

In T222, the XMPP server 10 sends the print URL "http://app.com/pd1" to the MFP 200 by using the XMPP session.

When receiving the print URL "http://app.com/pd1" from the XMPP server 10 in T222, the MFP 200 sends a response indicating that it has received the print URL "http://app.com/pd1" to the XMPP server 10 in T224.

When receiving the response from the MFP 200 in T224, the XMPP server 10 sends transmission complete information to the APP server 100 in T226. The transmission complete information is information indicating that transmission of the print URL "http://app.com/pd1" has been completed.

When receiving the transmission complete information from the XMPP server 10 in T224, the APP server 100 changes print state information corresponding to the print URL "http://app.com/pd1" in the job table 144 to "print start" in T228.

Further, when receiving the print URL "http://app.com/pd1" from the XMPP server 10 in T222, the MFP 200 sends a data request including the print URL "http://app.com/pd1" to the APP server 100 in T230. The data request is a HTTP command including the print URL "http://app.com/pd1". By using the print URL, the MFP 200 can receive the print data PD1 from the APP server 100 using a general HTTP command When receiving the data request from the MFP 200 in T230, the APP server 100 obtains the print data PD1 from the location in the APP server 100 indicated by the print URL "http://app.com/pd1".

In T232, the APP server 100 sends the print data PD1 to the MFP 200. In the present case, the image corresponding to the print data PD1 is ten pages of images. The APP server 100 divides the print data PD1 into pieces of page data each corresponding to one of the pages, and sequentially sends the pieces of page data to the MFP 200. Due to this, the MFP 200 executes printing of each of the pages corresponding to the print data PD1 in T234.

Figure 5:
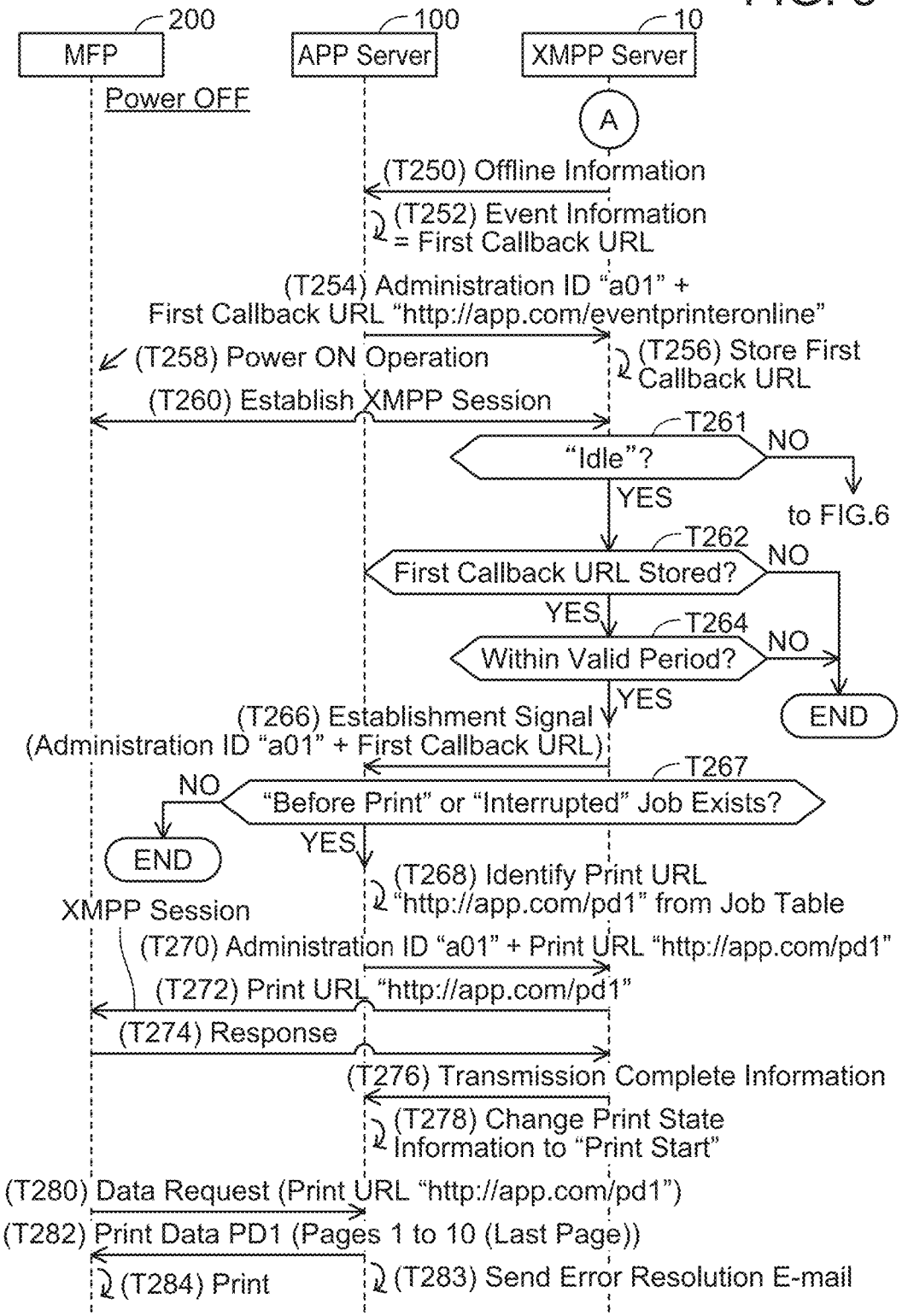
FIG. 5 shows a specific case in which an XMPP session is not established.

(Specific Case in which XMPP Session is not Established: FIG. 5)

A specific case in which the XMPP session with the MFP 200 is currently not established (i.e., case determining NO in T220 of FIG. 4) will be described with reference to FIG. 5. In the present case, the XMPP session with the MFP 200 is disconnected due to power of the MFP 200 being OFF.

In T250, the XMPP server 10 sends to the APP server 100 offline information indicating that the XMPP session is disconnected.

When receiving the offline information from the XMPP server 10 in T250, the APP server 100 stores a first Callback URL "http://app.com/eventprinteronline" in the device table 142 as event information in association with the administration ID "a01" in T252. The first Callback URL is a URL indicating a destination to which the XMPP server 10 sends an establishment signal to be described later in response to the XMPP session being re-established. Further, a character string "eventprinteronline" in the first Callback URL indicates a process which the APP server 100 is to execute when the APP server 100 receives the first Callback URL from the XMPP server 10. The process indicated by the character string "eventprinteronline" is a process in which the APP server 10 re-sends the print URL to the XMPP server 10 in response to a signal from the XMPP server 10.

In T254, the APP server 100 sends the administration ID "a01" and the first Callback URL to the XMPP server 10. As a result of this, the XMPP server 10 stores in the administration table 42 the first Callback URL in association with the administration ID "a01" in T256.

Next in T258, the MFP 200 accepts an operation by the user to turn ON the power. Due to this, the MFP 200 uses the access token AT and establishes the XMPP session with the XMPP server 10 in T260.

When the XMPP session with the MFP 200 is established in T260, the XMPP server 10 determines in T261 whether the device state information stored in the administration table 42 in association with the administration ID "a01"

identifying the MFP 200 with which the XMPP session has been established indicates "idle". The XMPP server 10 proceeds to T262 in a case of determining that the device state information indicates "idle" (YES in T261).

In T262, the XMPP server 10 determines whether the first Callback URL is stored in association with the administration ID "a01" in the administration table 42. The XMPP server 10 proceeds to T264 in a case of determining that first Callback URL is stored in association with the administration ID "a01" in the administration table 42 (YES in T262).

In T264, the XMPP server 10 identifies the valid period information PH stored in association with the administration ID "a01" from the memory 34. Then, the XMPP server 10 determines whether a current date and time is within a valid period indicated by the identified valid period information PH. The XMPP server 10 executes processes from T266 in a case of determining that the current date and time is within the valid period (YES in T264).

Figure 6:
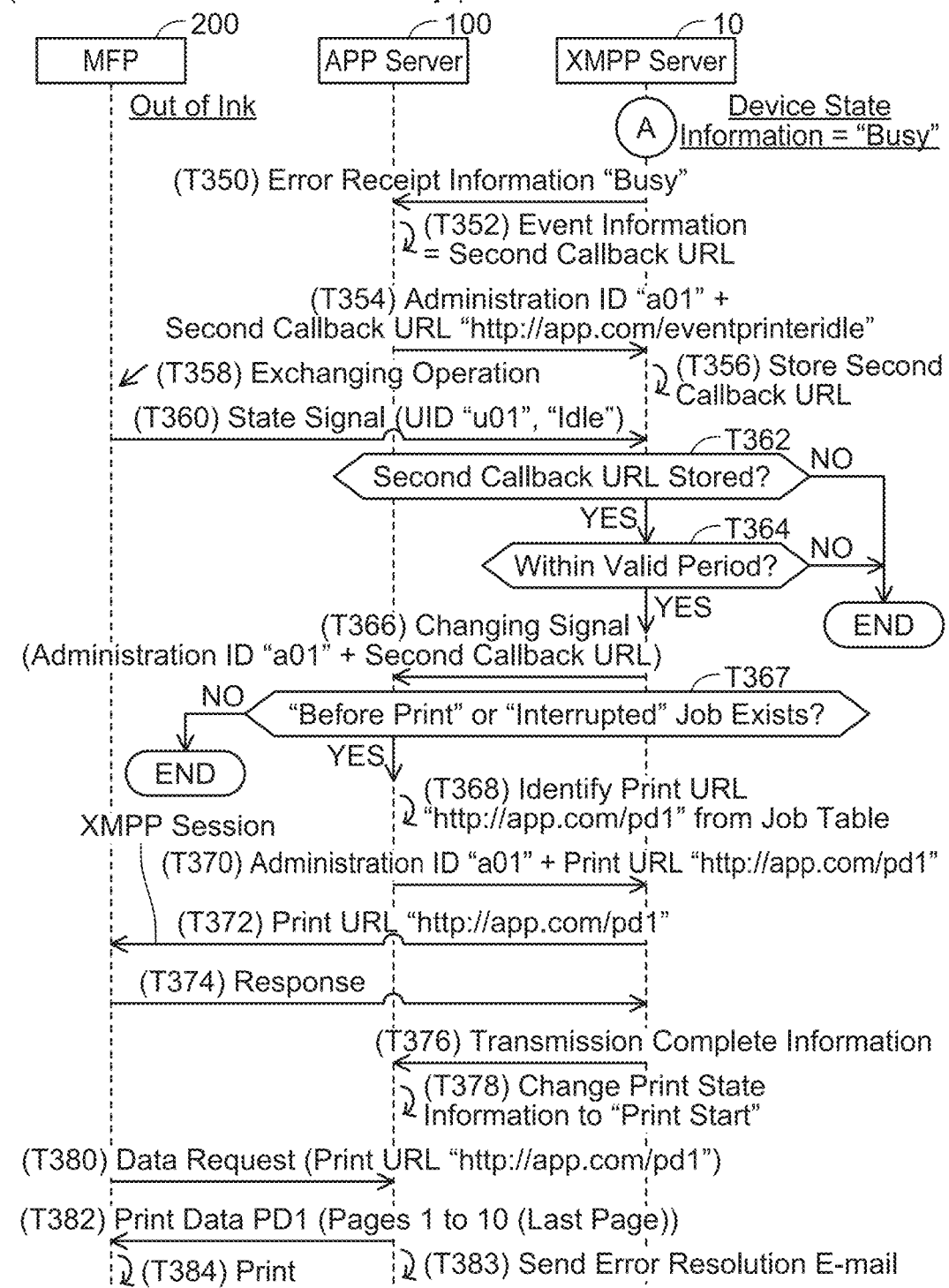
FIG. 6 shows a specific case in which a state of an MFP is "busy"

In a case of determining that the device state information indicates "busy" (NO in T261), the XMPP server 10 proceeds to the process of FIG. 6. On the other hand, the XMPP server 10 skips the processes from T266 and terminates the process of FIG. 5 in case of determining that the first Callback URL is not stored (NO in T262) or determining that the current date and time is beyond the valid period (NO in T264).

In T266, the XMPP server 10 sends to the APP server 100 an establishment signal indicating that the XMPP session has been re-established. This establishment signal is a HTTP command including the administration ID "a01" and the first Callback URL.

When receiving the establishment signal from the XMPP server 10 in T266, the APP server 100 executes processes of T267 to T270 in accordance with the first Callback URL character string "eventprinteronline" in the establishment signal.

In T267, the APP server 100 confirms that, in the device table 142, the first Callback URL is described in the event information associated with the administration ID "a01" included in the establishment signal. Then, the APP server 100 identifies the print state information stored in the job table 144 in association with the administration ID "a01" included in the establishment signal, and determines whether the identified print state information indicates "before print" or "interrupted". In other words, the APP server 100 determines whether print data that is to be sent to the MFP 200 exists. In the present case, the APP server 100 determines that the identified print state information indicates "before print" (YES in T267) and proceeds to T268. On the other hand, in a case of determining that the identified print state information indicates neither "before print" nor "interrupted" (NO in T267), the APP server 100 terminates the process of FIG. 5.

In T268, the APP server 100 identifies the print URL "http://app.com/pd1" associated with the identified print state information from the job table 144. Then, in T270, the APP server 100 sends the administration ID "a01" and the identified print URL "http://app.com/pd1" to the XMPP server 10.

T274 to T282 are the same as T222 to T232 of FIG. 4. That is, in the case where the XMPP session with the XMPP server 10 is re-established, the MFP 200 can receive the print URL "http://app.com/pd1" from the XMPP server 10 without sending a request to the XMPP server 10. As a result, the MFP 200 can execute the printing of the image corresponding to the print data PD1 in T284.

Further, in T283, the APP server 100 identifies the sender address of the e-mail EM (see T200 of FIG. 4) stored in association with the administration ID "a01" from the memory 134. Then, the APP server 100 sends an error resolution e-mail with the identified sender address as a recipient address thereof. The error resolution e-mail includes a message indicating that an error caused by the disconnection of the XMPP session has been resolved. Due to this, the user who reads the error resolution e-mail can acknowledge that the error caused by the disconnection of the XMPP session has been resolved.

(Specific Case in which State of MFP 200 is "Busy": FIG. 6)

A specific case in which the device state information of the MFP 200 indicates "busy" will be described with reference to FIG. 6. In the present case, the XMPP server 10 receives the state signal including the information "busy" from the MFP 200 (see T90 of FIG. 3) due to the MFP 200 being out of ink before receiving the e-mail EM in T200 of FIG. 4. As a result, the XMPP server 10 determines that the device state information of the MFP 200 indicates "busy" (NO in T218 of FIG. 4).

In T350, the XMPP server 10 sends to the APP server 100 error receipt information "busy" indicating that the information "busy" has been received from the MFP 200.

When receiving the error receipt information "busy" from the XMPP server 10 in T350, the APP server 100 stores a second Callback URL "http://app.com/eventprinteridle" as the event information in association with the administration ID "a01" in the device table 142 in T352. The second Callback URL is a URL indicating a destination to which the XMPP server 10 sends a changing signal to be described later in response to the state of the MFP 200 being changed from "busy" to "idle". A character string "eventprinteridle" in the second Callback URL indicates a process which the APP server 100 is to execute when the APP server 100 receives the second Callback URL from the XMPP server 10. The process indicated by the character string "eventprinteridle" is a process in which the APP server 100 re-sends the print URL to the XMPP server 10 in response to a signal from the XMPP server 10.

T354 and T356 are the same as T254 and T256 of FIG. 5 except that the second Callback URL is used.

Next, in T358, the user of the MFP 200 performs an operation of exchanging the ink of the MFP 200. Due to this, the state of the MFP 200 is changed from "busy" to "idle", and the MFP 200 sends the state signal including the information "idle" to the XMPP server 10 in T360.

When receiving the state signal including the information "idle" from the MFP 200 in T360, the XMPP server 10 executes determinations of T362 and T364. T362 is the same as T262 of FIG. 5 except that the determination is made on whether the second Callback URL is stored. T364 is the same as T264 of FIG. 5.

In a case of determining that the second Callback URL is stored and further determining that the current date and time is within the valid period (YES in T362, YES in T364), the XMPP server 10 sends to the APP server 100 the changing signal indicating that the state of the MFP 200 has been changed to "idle". The changing signal is a HTTP command including the administration ID "a01" and the second Callback URL.

When receiving the changing signal from the XMPP server 10 in T366, the APP server 100 executes processes of T367 to T370 in accordance with the character string "eventprinteridle" of the second Callback URL in the changing signal. T367 to T370 are the same as T267 to T270 of FIGS. 5.

T372 to T382 are the same as T272 to T282 of FIG. 5. T383 is the same as T283 of FIG. 5 except that the error resolution e-mail includes a message indicating that an error caused by the state of the MFP 200 being "busy" has been resolved. By seeing the message in the error resolution e-mail, the user can acknowledge that the error caused by the state of the MFP 200 being "busy" has been resolved. T384 is the same as T284 of FIG. 5.

According to the present case, in the case where the state of the MFP 200 is changed from "busy" to "idle", the XMPP server 10 sends the changing signal to the APP server 100 and receives the print URL from the APP server 100 (T370 of FIG. 6). Further, the XMPP server 10 uses the XMPP session and sends the print URL to the MFP 200 (T372). Due to this, the MFP 200 sends the print URL to the APP server 100 and receives from the APP server 100 the print data PD1 corresponding to the print URL (T382). For example, a comparative example may be assumed in which the MFP 200 requests the APP server 100 to send the print data PD1 without receiving an instruction from the XMPP server 10. In this comparative example, receipt of the print data PD1 could fail depending on a status of the APP server 100. Contrary to this, according to the present case, the MFP 200 receives the print data PD1 from the APP server 100 in response to an instruction from the XMPP server 10 (i.e., the communication of T372). The APP server 100 can suitably send the print data PD1 to the MFP 200 when the error in the MFP 200 is resolved.

Further, in the present case, the XMPP server 10 determines whether the state of the MFP 200 is "idle" (T218 of FIG. 5) before the APP server 100 sends the print data PD1 to the MFP 200, and the XMPP server 10 sends the error receipt information "busy" to the APP server 100 (T350 of FIG. 6) in the case where the state of the MFP 200 is "busy". According to such a configuration, the print data PD1 can be prevented from being sent to the MFP 200 despite the state of the MFP 200 being "busy".

Figure 7:
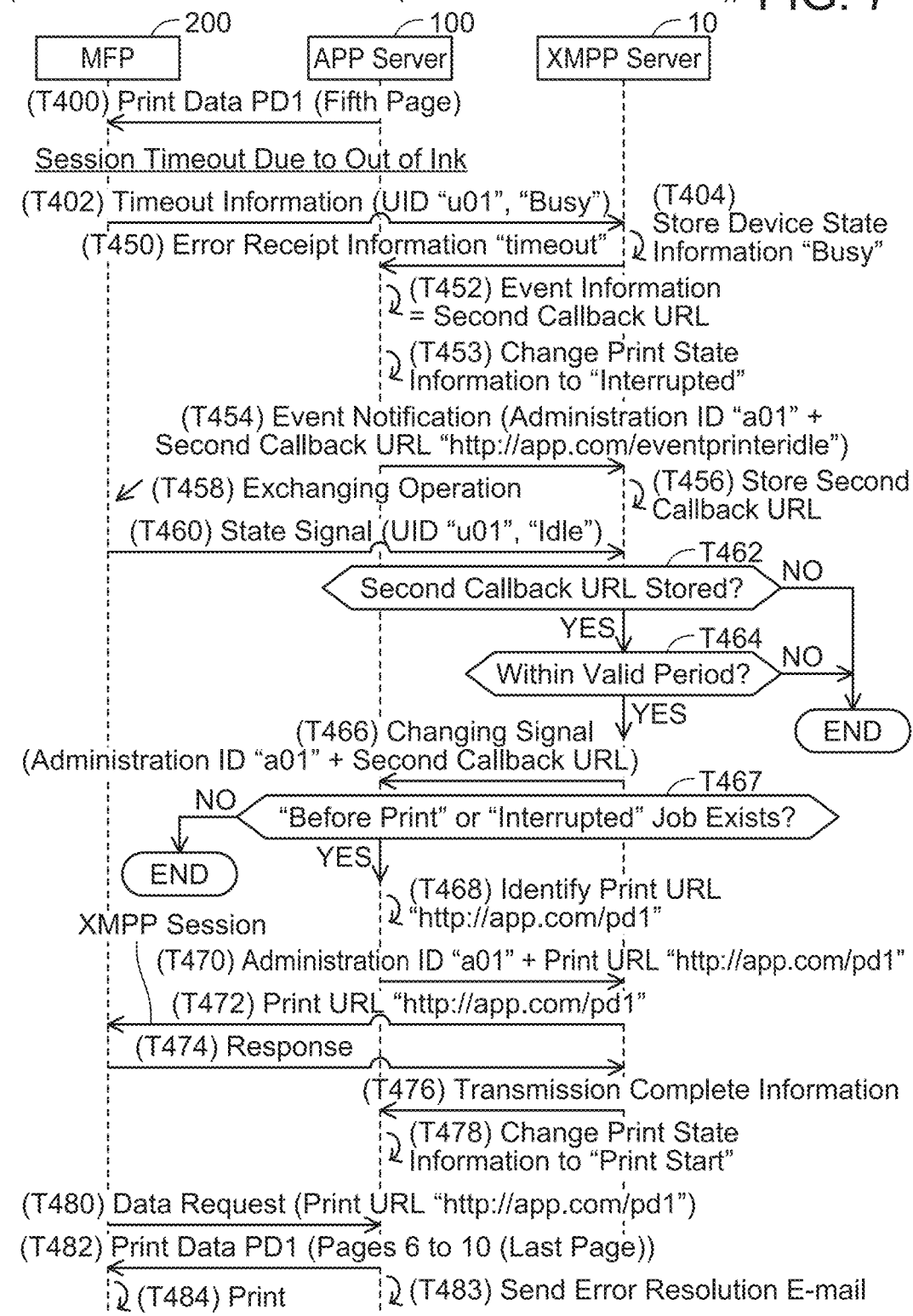
FIG. 7 shows a specific case in which timeout occurs.

(Specific Case in which Timeout Occurs: FIG. 7)

A specific case in which a timeout occurs will be described with reference to FIG. 7. The present case is a continuation of T230 of FIG. 4. In the present case, the APP server 100 sends one of the pieces of page data corresponding to page 5 of the print data PD1 in T400. Further, the MFP 200 runs out of ink at a timing when the MFP 200 receives this page data from the APP server 100. Due to this, the state of the MFP 200 is changed from "idle" to "busy", and the MFP 200 halts receipt of remaining page data corresponding to remaining pages. When a predetermined time elapses since when the receipt of the remaining page data has been halted, a HTTP session established by using the print URL in the data request of T230 of FIG. 4 is disconnected due to timeout.

When the timeout occurs, the MFP 200 sends to the XMPP server 10 timeout information indicating that the timeout has occurred in T402. The timeout information includes the UID "u01" of the MFP 200 and the information "busy".

When receiving the timeout information from the MFP 20 in T402, the XMPP server 10 stores the information "busy" included in the timeout information as the device state information in the administration table 42 in T404 in association with the UID "u01" included in the timeout information.

T450 is to the same as T350 of FIG. 6 except that error receipt information "timeout" indicating that the timeout information has been received from the MFP 200 is used. T452 is the same as T352 of FIG. 6.

In T453, the APP server 100 changes the print state information stored in the administration table 42 in association with the UID "u01" included in the timeout information from "print start" to "interrupted". T454 to T480 are the same as T354 to T380 of FIG. 6 except that it is determined in T467 that the print state information indicates "interrupted".

In T482, the APP server 100 sends to the MFP 200 the remaining page data corresponding to the remaining pages (pages 6 to 10 (last page)) of the print data PD1. For example, a comparative example may be assumed in which the APP server 100 sends an entirety of the print data PD1. In this comparative example, the page data corresponding to pages 1 to 5 that has already been sent is sent again to the MFP 200. Contrary to this, in the present case, the page data corresponding to pages 1 to 5 that has already been sent is not re-sent to the MFP 200, and transmission of redundant page data can thereby be prevented. In a variant, the configuration of the comparative example may be employed.

T483 is the same as T383 of FIG. 6 except that the error resolution e-mail includes a message indicating that an error caused by the timeout has been resolved. By seeing the message in the error resolution e-mail, the user can acknowledge that the error caused by the timeout has been resolved. T484 is the same as T384 of FIG. 6 except that printing of the remaining pages is executed.

According to the present case, after the occurrence of the timeout, the XMPP server 10 sends the changing signal to the APP server 100 due to resolution of the error being the cause of the timeout (e.g., out of ink), and receives the print URL from the APP server 100 (T470 of FIG. 7). Further, the XMPP server 10 sends the print URL to the MFP 200 using the XMPP session (T472). Due to this, the MFP 200 sends the print URL to the APP server 100 and receives the print data PD1 corresponding to the print URL from the APP server 100 (T482). For example, a comparative example may be assumed in which the MFP 200 requests the APP server 100 to send the print data PD1without receiving an instruction from the XMPP server 10. In this comparative example, receipt of the print data PD1 could fail depending on the status of the APP server 100. Contrary to this, according to the present case, the MFP 200 receives the print data PD1 from the APP server 100 in response to an instruction from the XMPP server 10 (i.e., the communication of T472). The APP server 100 can suitably send the print data PD1 to the MFP 200 when the error being the cause of the timeout is resolved.

Further, in the present case, the XMPP server 10 sends the error receipt information "timeout" to the APP server 100 (T450) in the case where the timeout information is received from the MFP 200 (T402 of FIG. 7) after the APP server 100 has sent the print data PD1 to the MFP 200. According to such a configuration, even in the case where an error occurs after the APP server 100 having sent the print data PD1, the print data PD1 can suitably be sent to the MFP 200 after the error is resolved.

Further, as indicated in T90 of FIG. 3, when the state of the MFP 200 is changed from "idle" to "busy" before receiving the print data from the APP server 100 (i.e., before executing the printing), the MFP 200 sends the state signal to the XMPP server 10. Further, as indicated in T460 of FIG. 7, the MFP 200 sends the state signal to the XMPP server 10 also when the printing is interrupted after the MFP 200 having received the print data from the APP server 100 and the state of the MFP 200 is changed from "idle" to "busy". That is, the XMPP server 10 can acknowledge the current state of the MFP 200 regardless of whether the MFP 200 is executing printing. The XMPP server 10 can send the print URL (i.e., print instruction) to the MFP 200 based on the current state of the MFP 200 (see T218 of FIG. 4, T460 of FIG. 7) regardless of whether the MFP 200 is executing printing.

Further, the MFP 200 sends the same state signal to the XMPP server 10 (T90 of FIG. 3, T460 of FIG. 7) in both cases where the state of the MFP 200 is changed to "busy" before the MFP 200 executes printing and where the state of the MFP 200 is changed to "busy" after the MFP 200 has executed printing. For example, a comparative example may be assumed in which a state signal is sent when the state of the MFP 200 changes to "busy" before the MFP 200 executes printing and a signal different from the state signal and requesting a server (e.g., APP server 100) to send print data is sent when the state of the MFP 200 changes to "busy" after the MFP 200 has executed printing. In this comparative example, the MFP 200 needs to include an additional program for sending the signal different from the state signal. Contrary to this, according to the configuration of the embodiment, such an additional program does not need to be included. The configuration of the MFP 200 can be simplified.

(Corresponding Relationship)

The communication system 2, the XMPP server 10, the APP server 100, the terminal device 300, the MFP 200, and the memory 134 are respectively an example of "communication system", "first server", "second server", "terminal device", "communication device", and "memory". "Busy" and "idle" are respectively an example of "error state" and "non-error state". The image data is an example of "data". The image data in the e-mail EM and the print data PD1 are respectively an example of "first data" and "second data (and third data)". The administration ID "a01" and the first and second Callback URLs are examples of "destination information". The administration ID "a01" and the first and second Callback URLs are respectively an example of "specific information" and "first URL". The state signals in T360 of FIGS. 6 and T460 of FIG. 7 are examples of "state change information". The print URL is an example of "first relation information", "first instruction information", and "second URL". The print URL is also an example of "second relation information" and "second instruction information". The XMPP session is an example of "session". The page data corresponding to pages 1 to 5 and the page data corresponding to pages 6 to 10 are respectively an example of "portion of the third data" and "rest of the third data". The error resolution e-mail is an example of "notification information".

T210 of FIG. 4 is an example of "store the data in a memory". In the case of FIG. 6, T90 of FIGS. 3 and T350, T354, T366, T367, T370, T372, and T382 of FIG. 6 are respectively an example of "receive error information", "send error receipt information", "send destination information", "send the changing signal", "identify from the memory", "send first relation information", "send to the communication device first instruction information", and "send to the communication device second data". In the case of FIGS. 7, T402, T450, T454, T466, T467, T470, T472, and T482 of FIG. 7 are respectively an example of "receive error information", "send error receipt information", "send destination information", "send the changing signal", "identify from the memory first data", "send first relation information", "send to the communication device first instruction information", and "send to the communication device second data".

Second Embodiment

In the first embodiment, the e-mail printing is executed. Instead of this, application printing is executed in a second embodiment. In the application printing, the APP server 100 receives a HTTP command including image data instead of the e-mail including image data. Due to this, the APP server 100 and the XMPP server 10 operate in cooperation and cause the MFP 200 to execute printing of an image corresponding to the image data included in the HTTP command (Configuration of APP Server 100: FIG. 2)

The APP server 100 of the present embodiment is the same as the APP server 100 of the first embodiment except that information in the device table 142 is different. Specifically, the device table 142 stores a UID, an administration ID, a terminal ID being identification information of a terminal device, and event information in association with each other.

(Setup Process: FIG. 3)

A setup process of the present embodiment will be described with reference to FIG. 3. A registration process in the present embodiment is the same as the setup process of the first embodiment except that contents of T10, T20, T36, and T50 are different, and the processes of T12 and T80 to T84 and the process of FIG. 4 are not executed.

In T10, the APP server 100 receives a registration request including a UID "u01" and a terminal ID "t01" from the terminal device 300. Due to this, in T20, the APP server 100 stores the UID "u01", the administration ID "a01", and the terminal ID "t01" in the device table 142 in association with each other. Further, in T36, the APP server 100 sends the PIN code C received from the XMPP server 10 to the terminal device 300. Due to this, the terminal device 300 displays the PIN code C.

In T50, the MFP 200 accepts an input of the PIN code C by the user. Then, the MFP 200 sends an establishment request including the inputted PIN code C to the XMPP server 10.

(Process for Executing Application Printing: FIG. 8)

A process for executing the application printing will be described with reference to FIG. 8. In T500, the terminal device 300 activates a print application for executing printing of images in response to an operation performed by the user. The terminal device 300 displays a selection screen for selecting an image to be printed and print setting according to the print application.

In T502, the terminal device 300 accepts selections of the image and the print setting in the selection screen. In T600, the terminal device 300 sends a HTTP command including image data corresponding to the selected image, the selected print setting, and the terminal ID "t01" to the APP server 100.

When receiving the HTTP command in T600, the APP server 100 identifies the administration ID "a01" stored in association with the terminal ID "t01" included in the HTTP command from the device table 142. T602 to T634 are to the same as T202 to T234 of FIG. 4.

Effects of Embodiment

As shown in FIG. 8, in the present embodiment as well, the XMPP server 10 determines whether the device state information indicates "idle" in T618. Then, in the case of determining that the device state information indicates "busy" (NO in S618), the XMPP server 10 executes the same process as FIG. 6 of the first embodiment. Further, in the present embodiment as well, the same process as FIG. 7 of the first embodiment is executed when a timeout occurs after the APP server 100 has sent the print data PD1. That is, in the present embodiment, in the same manner as the first embodiment, the APP server 100 can suitably send the print data PD1 to the MFP 200 when the error in the MFP 200 is resolved.

For example, in the process of FIG. 6 of the present embodiment, the APP server 100 sends the error resolution message to the terminal device 300 (T383) in the case of receiving the transmission complete information from the XMPP server 10 (T376). The error resolution message indicates that an error caused by the state of the MFP 200 being "busy" has been resolved. Due to this, the terminal device 300 displays the error resolution message according to the print application. By seeing the screen on the terminal device 300, the user can acknowledge that the error caused by the state of the MFP 200 being "busy" has been resolved.

(Corresponding Relationship)

The error resolution message is an example of "notification information". T610 of FIG. 8 is an example of "store the data in a memory".

(Variant 1) The "communication device" is not limited to the MFP 200, and may for example be a printer, a scanner, a facsimile device, a PC, a server, or the like.

(Variant 2) The "memory" s not limited to the memory 134 of the APP server 100, and for example, it may be a memory provided separately from the APP server 100.

(Variant 3) In each of the embodiments above, the XMPP server 10 receives the administration ID "a01" and a Callback URL from the APP server 100 (T354 of FIG. 6). Instead of this, the XMPP server 10 may receive the administration ID "a01" and a part of the Callback URL (e.g., "eventprintidle") from the APP server 100. In the present variant, the administration ID "a01" and the part of the Callback URL are examples of "destination information", and "first URL" may be omitted. Further, the XMPP server 10 may receive only the Callback URL from the APP server 100. In the present variant, the Callback URL is an example of "destination information", and "specific information" may be omitted.

(Variant 4) In each of the embodiments above, the APP server 100 sends to the XMPP server 10 the print URL indicating the location where the print data PD1 is stored (T370 of FIG. 6). Instead of this, the APP server 100 may send to the XMPP server 10 data URL indicating a location where the image data included in the e-mail EM is stored. Further, in the case of receiving data URL from the MFP 200, the APP server 100 may convert the image data stored in the location indicated by the data URL and generate the print data. In the present variant, the data URL is an example of "first relation information".

(Variant 5) In the case of FIG. 7, the print URL sent in T212 of FIG. 4 may be different from the print URL sent in T470 of FIG. 7. In the present variant, "second relation information" may be different from "first relation information". Further, the print URLs and Callback URLs described in the present disclosure include "http://", however, at least one of them may include "https://".

(Variant 6) In each of the embodiments above, the XMPP server 10 uses the XMPP session to send the print URL to the MFP 200 (T372 of FIG. 6, T222 of FIG. 4). Instead of this, the XMPP server 10 may send information in which the print URL is encrypted to the MFP 200.

In the present variant, the information in which the print URL is encrypted is an example of "first instruction information (and second instruction information)".

(Variant 7) In each of the embodiments above, the APP server 100 converts the image data to generate the print data and sends this print data to the MFP 200 (T382 of FIG. 6). Instead of this, the APP server 100 may send the image data itself to the MFP 200. In the present variant, "second data" may be the same as "first data".

(Variant 8) One of the process of FIG. 6 and the process of FIG. 7 may not be executed. Further, the process of FIG. 5 also may not be executed.

(Variant 9) In each of the embodiments above, the APP server 100 sends the remaining page data of the print data PD1 to the MFP 200 (T482 of FIG. 7). Instead of this, the APP server 100 may send the entirety of the print data PD1 to the MFP 200. In the present variant, "portion of the third data" and "rest of the third data" may be omitted.

(Variant 10) T383 of FIGS. 6 and T483 of FIG. 7 may not be executed. In the present variant, "notification information" may be omitted.

(Variant 11) "First relation information" is not limited to the print URL, and may for example be data identification information for identifying print data (or image data) stored in the APP server 100. In the present variant, "second URL" may be omitted.

(Variant 12) "First data" is not limited to the image data, and may for example be a setting value of the MFP 200.

(Variant 13) "Second data" is not limited to the print data, and may for example be facsimile information including image data. In this case, when receiving the facsimile information from the APP server 100, the MFP 200 may convert the image data included in the facsimile information and generate facsimile data, and may send the facsimile data to a predetermined destination via the PSTN I/F 220.

(Variant 14) In the above embodiments, the respective processes of FIGS. 3 to 8 are realized by software (e.g., the program 40, 140, 240). Alternatively, one or more of the processes may be realized by hardware such as a logic circuit.

What is claimed is:

1. A communication system comprising:
    a first server; and
    a second server, wherein
    the second server comprises:
        a second processor; and
        a second storage storing second computer-readable instructions therein,
        wherein the second computer-readable instructions, when executed by the second processor, cause the second server to:
        in a case where data is received from a terminal device, store the data in memory,
    the first server comprises:
        a first processor; and
        a first storage storing first computer-readable instructions therein,
        wherein the first computer-readable instructions, when executed by the first processor, cause the first server to:
        receive error information from a communication device that is different from the terminal device at a predetermined timing, the error information indicating that a state of the communication device is an error state in which the communication device is not capable of processing data; and in a case where the error information is received from the communication device, send error receipt information to the second server, the error receipt information indicating that the error information has been received from the communication device, wherein the second computer-readable instructions, when executed by the second processor, further cause the second server to:

in a case where the error receipt information is received from the first server, send destination information to the first server, the destination information indicating a destination in the second server to which the first server is to send a changing signal in response to the state of the communication device being changed from the error state to a non-error state in which the communication device is capable of processing data, wherein the first computer-readable instructions, when executed by the first processor, further cause the first server to:

in a case where a state change information is received from the communication device after the destination information has been received from the second server, send the changing signal to the second server by using the destination information, the state change information indicating that the state of the communication device has been changed from the error state to the non-error state, wherein the second computer-readable instructions, when executed by the second processor, further cause the second server to:

in a case where the changing signal is received from the first server, identify from the memory first data to be sent to the communication device; and send first relation information related to the identified first data to the first server, wherein the first computer-readable instructions, when executed by the first processor, further cause the first server to:

in a case where the first relation information is received from the second server, send to the communication device first instruction information corresponding to the first relation information by using a session for executing server-push communication, the first instruction information being for instructing the communication device to send the first relation information corresponding to the first instruction information to the second server, and wherein the second computer-readable instructions, when executed by the second processor, further cause the second server to:

in a case where the first relation information is received from the communication device, send to the communication device second data obtained by using the first data related to the first relation information.

2. The communication system as in claim 1, wherein the predetermined timing is a timing before the second server sends the data in the memory to the communication device.

3. The communication system as in claim 1, wherein the predetermined timing is a timing after the second server has sent the data in the memory to the communication device.

4. The communication system as in claim 3, wherein the second computer-readable instructions, when executed by the second processor, further cause the second server to:

in a case where the first data is received from the terminal device, send to the first server second relation information related to the first data, wherein the first computer-readable instructions, when executed by the first processor, further cause the first server to:

in a case where the second relation information is received from the second server, send to the communication device second instruction information corresponding to the second relation information by using the session, the second instruction information being for instructing the communication device to send the second relation information corresponding to the second instruction information to the second server, wherein the second computer-readable instructions, when executed by the second processor, further cause the second server to:

in a case where the second relation information is received from the communication device, send to the communication device third data obtained by using the first data related to the second relation information, and wherein the error information indicates that the state of the communication device is the error state due to a failure of the communication device to receive the third data.

5. The communication system as in claim 4, wherein the error information is received by the first server from the communication device in a case where a portion of the third data is received by the communication device and a rest of the third data is not received by the communication device, and the second data is the rest of the third data.

6. The communication system as in claim 1, wherein the second computer-readable instructions, when executed by the second processor, further cause the second server to:

in a case where the first relation information is received by the first server, send notification information to the terminal device, the notification information being for notifying that the state of the communication device has been changed from the error state to the non-error state.

7. The communication system as in claim 1, wherein the destination information includes specific information for identifying the first data, the changing signal includes the specific information, and the first data is identified from the memory by using the specific information in the changing signal.

8. The communication system as in claim 1, wherein the destination information includes a first Uniform Resource Locator (URL), the changing signal includes the first URL, and in a case where the changing signal including the first URL is received by the second server from the first server, the first relation information is sent by the second server to the first server according to the first URL.

9. The communication system as in claim 1, wherein the data received from the terminal device is included in an email including a specific email address as a destination address, the specific email address including a domain name of the second server.

10. The communication system as in claim 1, wherein the data received from the terminal device is included in a command according to Hypertext Transfer Protocol of which sender is the terminal device.

11. The communication system as in claim 1, wherein the first relation information includes a second URL indicating a location of the data in the second server.

12. The communication system as in claim 1, wherein the communication device is a device configured to execute a print function, and the second data is data for causing the communication device to print an image corresponding to the second data.

13. The communication system as in claim 1, wherein the session is a session according to Extensible Messaging and Presence Protocol.

14. A first server comprising:
a first processor; and
a first storage storing first computer-readable instructions therein,
wherein the first computer-readable instructions, when executed by the first processor, cause the first server to:
receive error information from a communication device at a predetermined timing, the error information indicating that a state of the communication device is an error state in which the communication device is not capable of processing data;
in a case where the error information is received from the communication device, send error receipt information to a second server, wherein
the error receipt information indicates that the error information has been received from the communication device, and
the second server sends destination information to the first server, the destination information indicating a destination in the second server to which the first server is to send a changing signal in response to the state of the communication device being changed from the error state to a non-error state in which the communication device is capable of processing data;
in a case where a state change information is received from the communication device after the destination information has been received from the second server, send the changing signal to the second server by using the destination information, wherein
the state change information indicates that the state of the communication device has been changed from the error state to the non-error state,
the second server identifies from a memory first data to be sent to the communication device in a case where the changing signal is received from the first server, and the second server sends first relation information related to the identified first data to the first server; and
in a case where the first relation information is received from the second server, send to the communication device first instruction information corresponding to the first relation information by using a session for executing server-push communication, wherein
the first instruction information is information for instructing the communication device to send the first relation information corresponding to the first instruction information to the second server, and
the second server sends to the communication device second data obtained by using the first data related to the first relation information in a case where the first relation information is received from the communication device.

15. A second server comprising:
a second processor; and
a second storage storing second computer-readable instructions therein,
wherein the second computer-readable instructions, when executed by the second processor, cause the second server to:
in a case where data is received from a terminal device, store the data in a memory;
in a case where error receipt information is received from a first server, send destination information to the first server, wherein
the destination information indicates a destination in the second server to which the first server is to send a changing signal in response to a state of a communication device that is different from the terminal device being changed from an error state to a non-error state,
the first server receives error information from the communication device at a predetermined timing, the error information indicating that a state of the communication device is the error state,
the first server sends the error receipt information to the second server, the error receipt information indicating that the error information has been received from the communication device in a case where the error information is received from the communication device,
the error state is a state in which the communication device is not capable of processing data, and
the non-error state is a state in which the communication device is capable of processing data;
in a case where the first server receives a state change information from the communication device after the destination information has been sent to the first server, receive the changing signal from the first server, the state change information indicating that a state of the communication device has been changed from the error state to the non-error state;
in a case where the changing signal is received from the first server, identify from the memory first data to be sent to the communication device;
send first relation information related to the identified first data to the first server, wherein
the first server sends first instruction information corresponding to the first relation information by using a session for executing server-push communication to the communication device in a case where the first relation information is received from the second server, and
the first instruction information is information for instructing the communication device to send the first relation information corresponding to the first instruction information to the second server; and
in a case where the first relation information is received from the communication device, send to the communication device second data obtained by using the first data related to the first relation information.

16. A non-transitory computer-readable recording medium storing computer-readable instructions for a first server wherein the computer-readable instructions, when executed by a processor of the first server, cause the first server to:
receive error information from a communication device at a predetermined timing, the error information indicating that a state of the communication device is an error state in which the communication device is not capable of processing data;

in a case where the error information is received from the communication device, send error receipt information to a second server, wherein
the error receipt information indicates that the error information has been received from the communication device, and
the second server sends destination information to the first server, the destination information indicating a destination in the second server to which the first server is to send a changing signal in response to the state of the communication device being changed from the error state to a non-error state in which the communication device is capable of processing data;
in a case where a state change information is received from the communication device after the destination information has been received from the second server, send the changing signal to the second server by using the destination information, wherein
the state change information indicates that the state of the communication device has been changed from the error state to the non-error state,
the second server identifies from a memory first data to be sent to the communication device in a case where the changing signal is received from the first server, and
the second server sends first relation information related to the identified first data to the first server; and
in a case where the first relation information is received from the second server, send to the communication device first instruction information corresponding to the first relation information by using a session for executing server-push communication, wherein
the first instruction information is information for instructing the communication device to send the first relation information corresponding to the first instruction information to the second server, and
the second server sends to the communication device second data obtained by using the first data related to the first relation information in a case where the first relation information is received from the communication device.

17. A non-transitory computer-readable recording medium storing computer-readable instructions for a second server wherein the computer-readable instructions, when executed by a processor of the second server, cause the second server to:
in a case where data is received from a terminal device, store the data in a memory;
in a case where error receipt information is received from a first server, send destination information to the first server, wherein
the destination information indicates a destination in the second server to which the first server is to send a changing signal in response to a state of a communication device that is different from the terminal device being changed from an error state to a non-error state,
the first server receives error information from the communication device at a predetermined timing, the error information indicating that a state of the communication device is the error state,
the first server sends the error receipt information to the second server, the error receipt information indicating that the error information has been received from the communication device in a case where the error information is received from the communication device,
the error state is a state in which the communication device is not capable of processing data, and
the non-error state is a state in which the communication device is capable of processing data;
in a case where the first server receives a state change information from the communication device after the destination information has been sent to the first server, receive the changing signal from the first server, the state change information indicating that a state of the communication device has been changed from the error state to the non-error state;
in a case where the changing signal is received from the first server, identify from the memory first data to be sent to the communication device;
send first relation information related to the identified first data to the first server, wherein
the first server sends first instruction information corresponding to the first relation information by using a session for executing server-push communication to the communication device in a case where the first relation information is received from the second server, and
the first instruction information is information for instructing the communication device to send the first relation information corresponding to the first instruction information to the second server; and
in a case where the first relation information is received from the communication device, send to the communication device second data obtained by using the first data related to the first relation information.

* * * * *